United States Patent
Abramov

(10) Patent No.: US 11,178,988 B2
(45) Date of Patent: Nov. 23, 2021

(54) DEGRADABLE DRINKING STRAW

(71) Applicant: Igor Abramov, Vista, CA (US)

(72) Inventor: Igor Abramov, Vista, CA (US)

(*) Notice: Subject to any disclaimer, the term of this patent is extended or adjusted under 35 U.S.C. 154(b) by 244 days.

(21) Appl. No.: 16/686,121

(22) Filed: Nov. 16, 2019

(65) Prior Publication Data

US 2020/0154919 A1 May 21, 2020

Related U.S. Application Data

(60) Provisional application No. 62/768,595, filed on Nov. 16, 2018.

(51) Int. Cl.
*A47G 21/18* (2006.01)
*C08L 5/08* (2006.01)

(52) U.S. Cl.
CPC ............ *A47G 21/18* (2013.01); *C08L 5/08* (2013.01); *C08L 2201/06* (2013.01); *C08L 2205/03* (2013.01)

(58) Field of Classification Search
CPC .... A47G 21/18; A47G 21/181; A47G 21/182; A47G 21/183; A47G 21/184; A47G 21/185; A47G 21/186; A47G 21/187; A47G 21/188; A47G 21/189; C08L 5/08; C08L 2201/06; C08L 2205/03
USPC .......................................................... 239/33
See application file for complete search history.

(56) References Cited

U.S. PATENT DOCUMENTS

| | | | | |
|---|---|---|---|---|
| 2,040,880 A | * | 5/1936 | Rigby | D01F 4/00 536/20 |
| 5,010,181 A | * | 4/1991 | Coughlin | B01J 20/24 210/668 |
| 7,291,664 B2 | * | 11/2007 | Hao | C08L 89/005 524/414 |
| 2002/0030115 A1 | * | 3/2002 | Float | A47G 21/187 239/33 |
| 2004/0005385 A1 | * | 1/2004 | Emig | A23L 2/52 426/86 |
| 2012/0160928 A1 | * | 6/2012 | Jo | A47G 21/183 239/33 |
| 2014/0221528 A1 | * | 8/2014 | Ribi | G01K 11/12 523/351 |
| 2020/0022516 A1 | * | 1/2020 | Tsai | C08L 75/04 |
| 2020/0054157 A1 | * | 2/2020 | Wu | A47G 21/18 |
| 2020/0154919 A1 | * | 5/2020 | Abramov | C08B 37/003 |
| 2020/0156839 A1 | * | 5/2020 | Abramov | B65D 3/06 |
| 2020/0253403 A1 | * | 8/2020 | Huang | B29C 48/09 |
| 2020/0305623 A1 | * | 10/2020 | Steele | B32B 7/12 |

FOREIGN PATENT DOCUMENTS

| | | | | | |
|---|---|---|---|---|---|
| WO | WO-2007012142 A1 | * | 2/2007 | | C08L 5/08 |
| WO | WO-2020174234 A1 | * | 9/2020 | | C08L 5/00 |
| WO | WO-2021046041 A1 | * | 3/2021 | | B29C 48/05 |
| WO | WO-2021095002 A1 | * | 5/2021 | | B65D 77/28 |

* cited by examiner

*Primary Examiner* — Joshua E Rodden

(57) ABSTRACT

A disposable degradable drinking straw made of chitin contains water-activated degrading enzymes. Initially in inactive lyophilized (dry) form, the enzymes upon exposure to ambient water in environment degrade chitin-based drinking straw to chitosan, a benign compound.

17 Claims, 5 Drawing Sheets

DEGRADABLE DRINKING STRAW

FIELD OF INVENTION

This invention relates in general to disposable and degradable articles, and in particular to disposable drinking straws.

BACKGROUND OF INVENTION

At present, a great fraction of disposable food- and beverage packaging, containers and utensils are made of artificial polymer- or specially treated paper-based materials. Items made from these materials present an environmental problem when disposed, since they consume valuable volume in landfills, require considerable time to degrade and create general environmental contamination when not properly disposed of.

Plastic drinking straws present a particular disposing/recycling problem. Recycling them is problematic, since their small size and plastic content do not justify specific sorting efforts and their extraction from the general waste streams. Also, due to the small size and seeming inconsequence of drinking straws users are not strongly motivated to specifically seek ways to recycle them.

Yet, due to their sheer numbers used and their small size, plastic drinking straws present an ever-growing environmental pollution problem.

Societies' concerns about environmental impact of such discarded plastic waste facilitated looking for ways to either more efficient recycling of these items or making them safely and efficiently degradable.

Previous attempts to develop viable degradable materials have been focused on materials which would be degraded by action of sunlight or of microorganisms found in landfills.

Various treated paper- and starch-based plastic products have been tried for bio- or photo-degradable food packaging items, to largely disappointing results. It has been found that many landfills do not provide enough light or suitable living environments for microorganisms and so the discarded products do not get reliably degraded.

Also, the drinking straws have to be water-resistant. This presents technical problems for their degradable design.

There have been attempts to create reusable aluminum based drinking straws, but they have been relatively unsuccessful due to their high relative cost which limits their wide usage.

There also have been attempts to create edible drinking straws, but their acceptance has also been very limited, since, in addition to their high cost, they lack wide attractiveness for the users outside consumption of milk-based products, and are quickly degraded by aqueous solutions.

Various materials have been used to modify the conventional paper base used for degradable items, such as impregnation with various water-resistant compounds, such as waxes, or applying water-resistant surface coatings. These technologies have not been adopted to drinking straws, since they require a gluing process to create a straw's tubular shape, in addition of ensuring a waterproof performance while the straw is inserted into an aqueous medium.

The water-proofing chemicals used with paper have to be safe for consumers, offer reasonable protection and be, ideally, degradable. Their degradability, however had been problematic, since it has been shown that even a widely used disposable beverage cup made of waxed paper takes a very long time to degrade in landfills, in the order of ten to twenty years.

OBJECTIVES OF THE INVENTION

Thus, it is the objective of instant invention to provide a drinking straw that without pre-processing would be reliably degraded in landfills.

Another objective is to provide a drinking straw that would not require the action of microorganisms for its degradation.

Yet another objective is to provide a drinking straw that would be food- and beverage safe.

Another objective is to provide a drinking straw that would withstand aqueous solutions for extended, and preferably, unlimited, time during their use.

Another objective is to provide a drinking straw that would not affect the taste, dietary fitness or safety of the consumed liquids.

Yet another objective is to provide a drinking straw that upon degradation would produce residues usable in other applications or would be benign or beneficial for the environment.

Another objective is to provide a drinking straw that would use inexpensive, abundant and, ideally, renewable materials for its construction.

SUMMARY OF THE INVENTION

In accordance with the present invention, a drinking straw made of chitin is described. The chitin surfaces of the straw are impervious to water or other aqueous solutions. The drinking straw contains desiccated ('lyophilized') enzymes, which, when activated by a contact with an ambient water decompose chitin into chitosan, a water-soluble substance, and thus degrade the straw. Enzymes are protected from premature activation by special enzyme-containing compartments design and, optionally, via water ingress retarding means.

Items made of chitin, in the absence of degrading enzymes are water-resistant for virtually unlimited time. Chitosan, on the other hand, is water-soluble, environmentally benign and advantageously used in wide-ranging industrial, medical, biochemical and agricultural applications.

PRIOR ART

The prior art is comprised of methods of preparing films and filaments from chitin (U.S. Pat. No. 2,040,880 to Rigby et al.), food products made from alcoholized chitin (U.S. Pat. No. 2,783,148 to György et al.), photo- and bio-degradable multi-component compounds, some containing chitin (U.S. Pat. No. 7,291,664 to Hao).

There are also methods to enzymatically degrade chitin (U.S. Pat. No. 9,758,802 to Vaaje-Kolstad et al.).

However, none of the prior art above suggests or teaches making drinking straws made of chitin which are enzymatically degraded, as per instant invention.

OBJECTS AND ADVANTAGES

In contrast to the prior art mentioned hereinabove, the present invention provides a drinking straw made of chitin which is degradable by enzymes upon exposure to ambient water. Prior to its being enzymatically degraded, the chitin-based straw is virtually chemically inert and does not chemically affect the taste of the consumed beverage, and is safe for human use.

Chitin is the most abundant aminopolysaccharide polymer occurring in nature, and is the building material that gives strength to the exoskeletons of crustaceans, insects, and the cell walls of fungi. The structure of chitin is shown below (1).

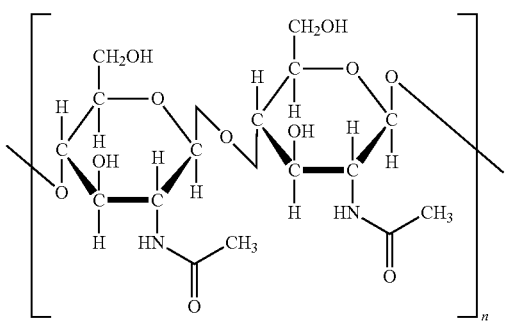

(1)

The main natural sources of chitin are shrimp and crab shells, which are an abundant byproduct of the seafood-processing industry and are a renewable resource. Per US Dept. of Commerce, in 1973 alone there were 1.5 million tons of chitin produced as waste from shellfish processing. The chitinous solid waste from shrimping operations in India alone amounted to 80,000 tons in 2004.

Through enzymatic or chemical deacetylation, chitin can be converted to its most well-known derivative, chitosan (2).

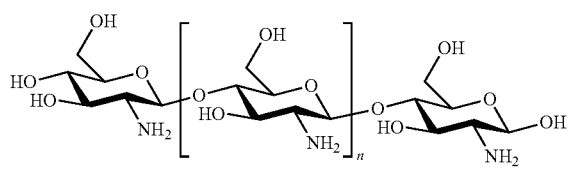

(2)

Chitosan, in addition to being water-soluble, has several environmentally beneficial properties, such as biodegrability, biocompatibility and non-toxicity. It is also widely used in biopharmaceuticals, biomedicine, surgical medicine, paint production, animal and fish fodder additives, soil augmentation and growth media.

DESCRIPTION OF THE EMBODIMENTS

In the foregoing description like components are labeled by the like numerals.

Figure 1:
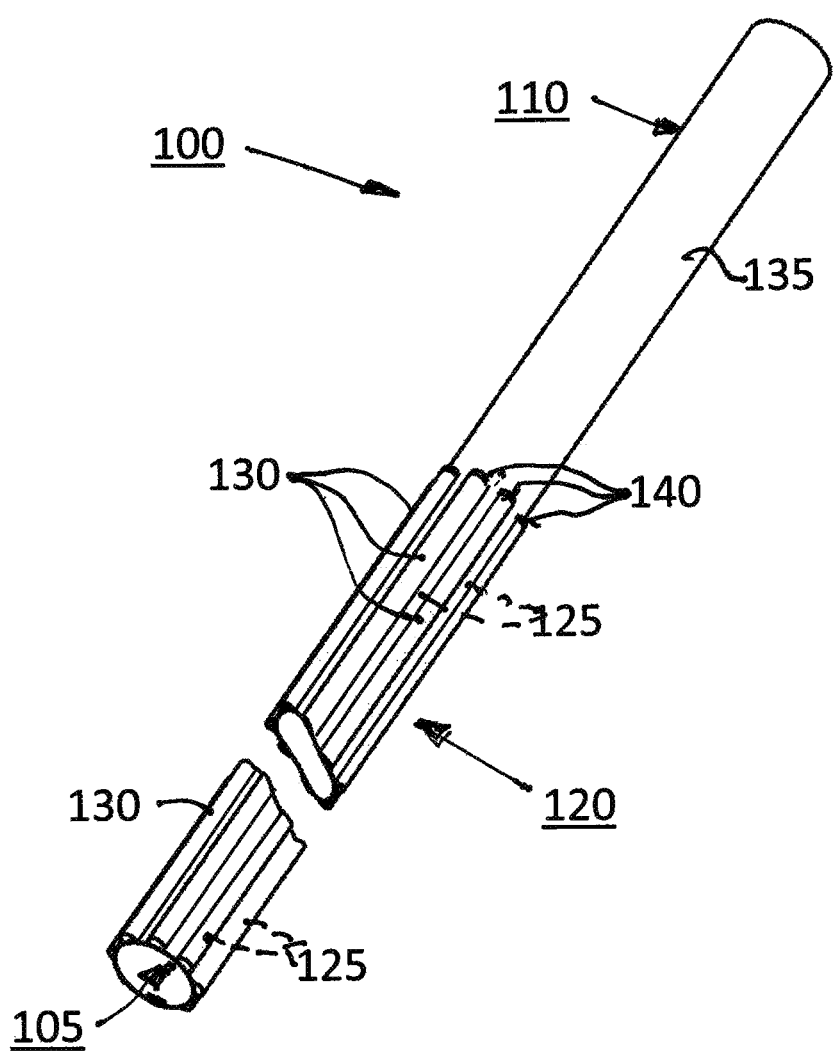
FIG. 1 is a perspective view of the degradable drinking straw with enzyme compartments.

Referring to FIG. 1 drinking straw 100 comprises a straw body 135 which in turn comprises the free end 110 which is inserted into user's mouth and submersible end 120 containing degrading enzymes 125.

Figure 3:
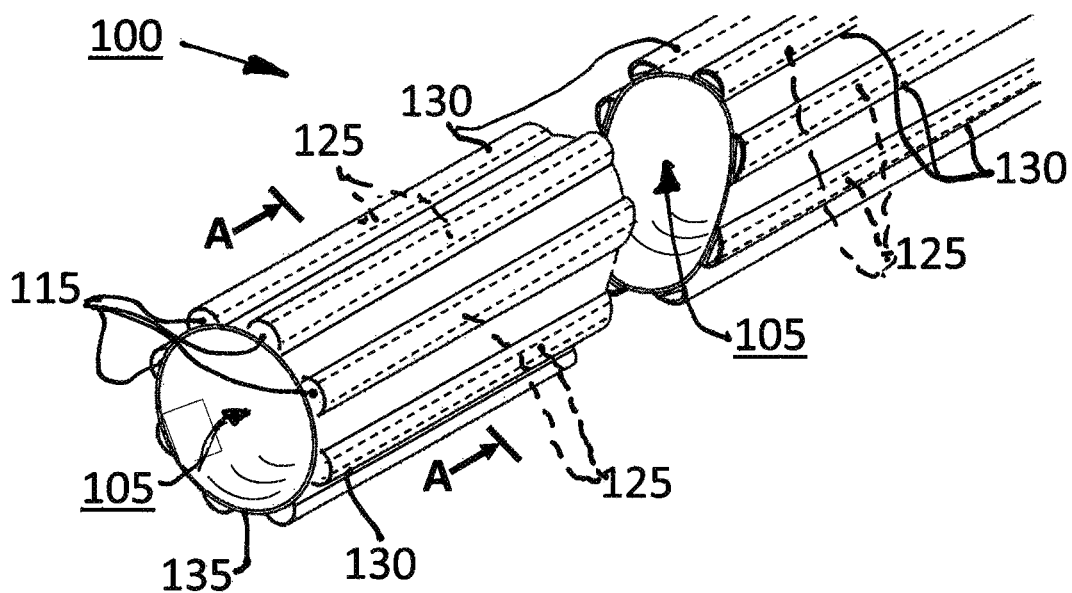
FIG. 3 is a partial perspective of a drinking straw.
Figure 4:
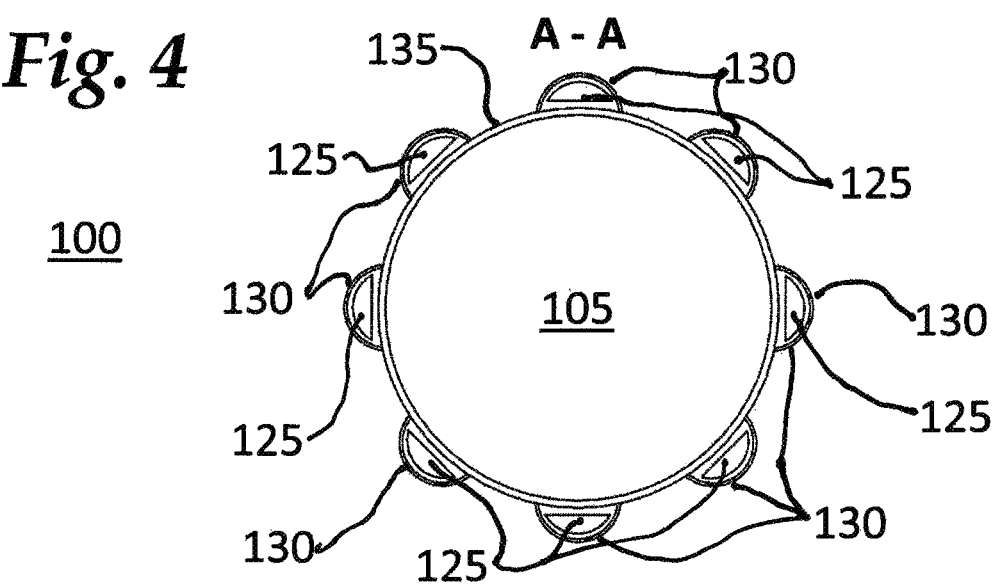
FIG. 4 is a cross-section of the degradable drinking straw taken along line A-A on FIG. 3.

Referring to FIGS. 3 and 4 straw's submersible end 120 comprises essentially convex hemispheric hollow enzyme compartments 130 positioned longitudinally on straw body 135 while leaving straw's lumen 105 unoccluded for unobstructed liquid flow. Each compartment 130 is sealed at the end proximal to the edge of straw body 135 by end cap 115. Each compartment 130 is open at its distal end to allow water ingress when the straw is discarded. Each compartment 130 further contains enzyme 125 within it.

Figure 5:
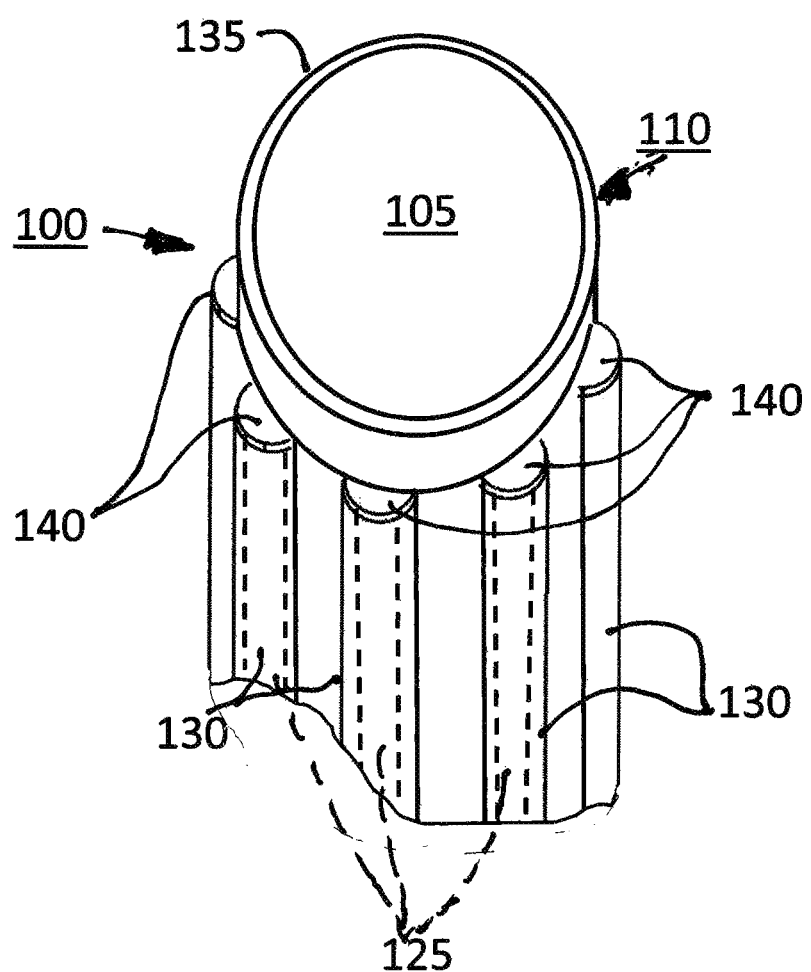
FIG. 5 is a partial perspective of the degradable drinking straw with infiltration retardation features.

Alternatively, as shown on FIG. 5 each compartment 130 can include water infiltration-control plug 140 on its distal end. Control plugs 140 can be made of a PVA (polyvinyl alcohol) or similar aqueously-soluble materials, or a porous filter-type degradable paper.

Straw body 135 and enzyme compartments 130 are made of chitin. Enzymes 125, preferably in the form of free-flowing powders, are loosely retained in compartments 130, so there are numerous capillary pathways for dissolved enzymes and water to propagate through the entire lengths of compartments 130.

Alternatively, enzymes 125 can be formed into pressed elongated shapes fitting inside compartments 130. Such shapes can be made to have smaller cross-sections than compartments' 130, to create capillary channels for water and dissolved enzyme propagation.

End caps 115 can be made of chitin or can be eliminated altogether by crimping or sealing enzyme compartments 130.

Enzymes 125 are preferably chitochinase-type enzymes or a combination of enzymes, initially in an inactive dry ('lyophilized') state. The chitochinase-type enzymes are well known in the art.

For example, some of the mostly studied chitochinase-type enzymes are those extracted from the fungi *Mucor rouxii, Absidia coerulea, Aspergillus nidulans* and *Colletotrichum lindemuthianum*. All these enzymes are glycoproteins.

The chitochinase-type enzymes in lyophilized powder form are commercially available, for example Product C6137 'Chitinase from *Streptomyces griseus*' and Product C8241 'Chitinase from Trichoderma viride', both by Sigma-Aldrich, Inc. of Saint Louis, Mo., USA.

Figure 6:
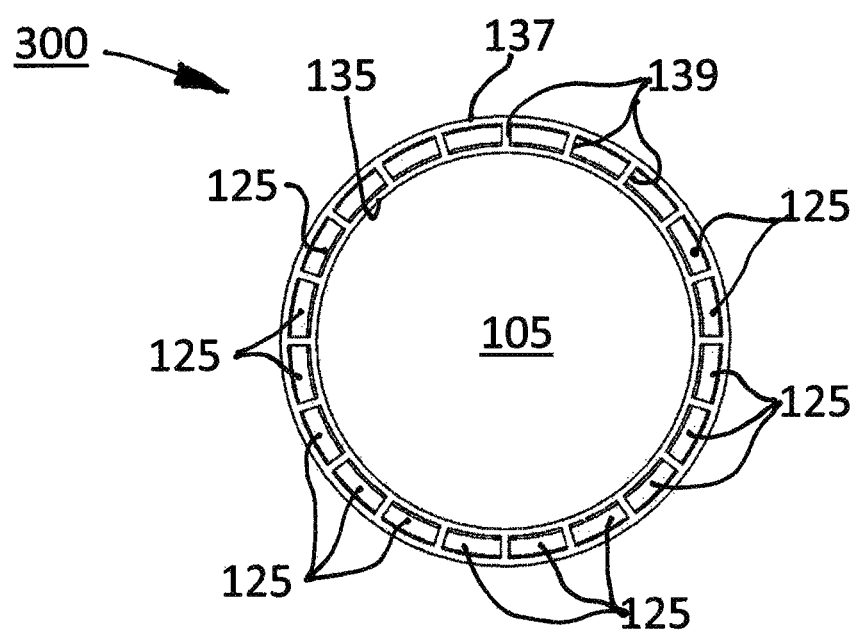
FIG. 6 is a cross-section of an alternative embodiment of the degradable drinking straw.

A cross-section of an alternative embodiment 300 of the straw is depicted on FIG. 6. It essentially comprises a double-walled tube comprising the inner shell 135 and the outer shell 137 interconnected with internal radial dividers 139. The spaces defined by the inner and the outer shells and dividers are filled with enzymes 125. Embodiment 300 also contains elements 115 and 140 of embodiment 100.

Both straw embodiments 100 and 300 can be fabricated by extrusion. Fabrication of multi-lumen tubes, similar to straw 100 and 300, and their respective enzyme compartments 130 and radial dividers 139 integrated into a complete part, is well known in the art. Such multi-lumen tubing and extruded parts are widely used in diverse applications and are commercially available from numerous suppliers.

OPERATION

Figure 2:
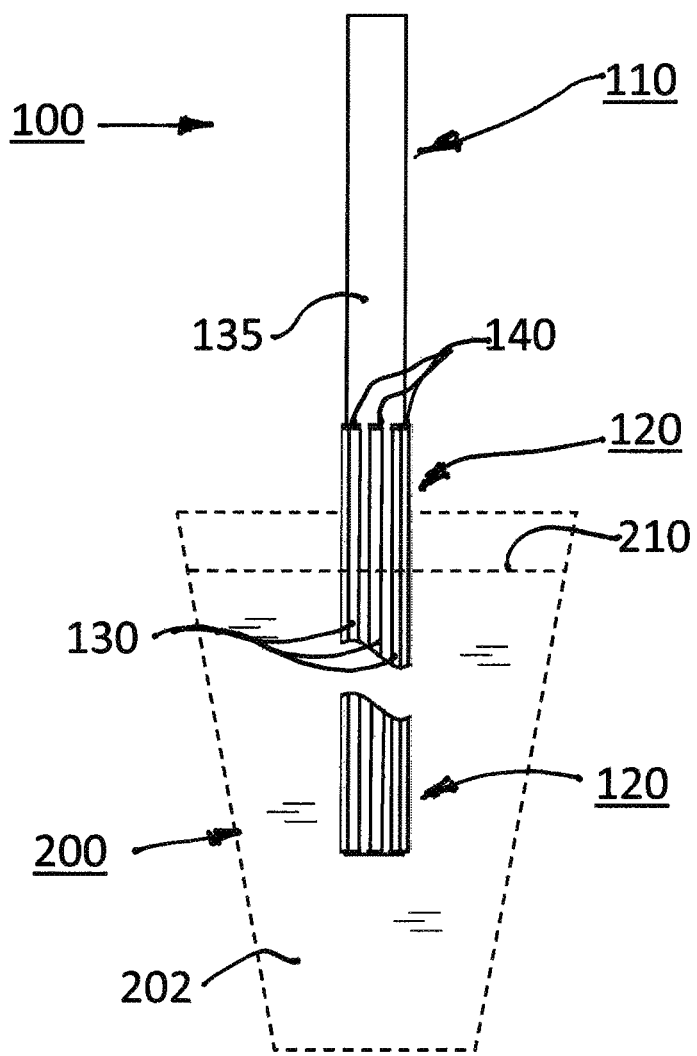
FIG. 2 is an elevation view of the degradable drinking straw inserted into a beverage holder.

As shown on FIG. 2, during use drinking straw 100 is placed into a beverage container 200 containing beverage 202, so that the upper edge of submersible section 120 of straw 100 is not submerged below level 210 of beverage 202, lest beverage 202 enters enzyme compartments 130 and causes premature degradation of straw 100 by activating enzymes 125.

The straw can remain in a beverage virtually indefinitely (provided the beverage does not enter enzyme compartments 130), since the chitin material of straw 100 is impervious to water. When discarded, the straw is exposed to the environment where it will be eventually exposed to water which will enter enzyme compartments 130 and degrade the straw.

Upon exposure to environmental water, the lyophized enzymes 125 are activated and proceed to decompose wall 135 and enzyme compartments 130 of straw 100 via hydrolysis of N-acetamido bonds in chitin which break down (acetylate) chitin and convert it to chitosan.

If a straw contains retardation devices such as plugs 140 made to dissolve or having controlled porosity, the ambient water first dissolves the plugs or slowly penetrates them before reaching the enzyme. This prevents premature enzyme activation from accidental contact with water or aqueous substances (e.g. user spilling a beverage onto a straw) during straw use.

The total amount of enzymes 125 is sufficient to degrade not only the enzyme-containing portion 120 of straw 100, but also the short free end 110 which is inserted into user's mouth.

ADDITIONAL EMBODIMENTS

Although descriptions provided above contain many specific details, they should not be construed as limiting the scope of the present invention.

Disposable degradable beverage and food containers and their corresponding lids and covers are also possible with the underlying technology described hereinabove.

Various enzyme containment means, such as internal ribs, dividers, pockets and depressions can be added to the straw.

The shape and number of enzyme compartments can vary as well.

Also, depending on the catalytic efficiency of the selected enzyme(s), rather than covering most of the straw's length, the enzyme-containing portion of the straw may be limited to only its part between the level of the beverage and the user's mouth.

Other articles can be made degradable using the technology described herein above, such as packaging and utensils.

Thus, the scope of this invention should be determined from the appended claims and their legal equivalents.

I claim:

1. A degradable tubular article comprising a combination of an inner tube and an outer tube, whereby inner diameter of said outer tube is larger than outer diameter of said inner tube, said inner tube coaxially disposed inside said outer tube, said inner tube comprising lumen of said article, said inner tube further comprising chitin-type polysaccharide compound or compounds, said inner tube and said outer tube comprising at least one cavity between them, said at least one cavity further comprising chitin-degrading enzyme or enzymes, said enzyme or enzymes being present in inert form.

2. The article in claim 1 wherein said outer tube and said inner tube are longitudinally connected by at least one radial spacer, said spacer in conjunction with said outer tube and said inner tube comprising said at least one cavity.

3. The article in claim 1 wherein said outer tube comprises compound or compounds containing chitin-degrading type of enzyme or enzymes.

4. The article in claim 1 wherein said at least one cavity is sealed at at least one of its ends.

5. The article in claim 1 wherein said outer tube is shorter than said inner tube.

6. The article in claim 1 wherein said outer tube comprises compound or compounds containing chitin-type polysaccharide.

7. The article in claim 1 wherein said outer tube comprises at least one water ingress aperture, said aperture communicating with environment outside said outer wall.

8. The article of claim 7 wherein said aperture further comprises at least one water ingress retardation element.

9. The article of claim 8, wherein the retardation element further comprises a plug located inside said aperture.

10. The article of claim 9, wherein said plug further comprises polyvinyl alcohol.

11. The article of claim 9, wherein said plug further comprises a porous compound, said compound permeable by water, said compound comprising bio- or photo-degradable material or materials.

12. A degradable article comprising a tube, said tube further comprising chitin-type compound or compounds, said tube further comprising at least one enclosed compartment, said compartment located outside of lumen of said tube, wherein said compartment further comprises chitin-degrading enzyme or enzymes, said enzyme or enzymes being present in inert form, wherein said compartment further comprises at least one aperture, said aperture in communication with environment outside said article, wherein said aperture being capable of providing water ingress into said compartment, and wherein said aperture further comprises at least one water ingress retardation element.

13. The article of claim 12, wherein said retardation element comprises a plug.

14. The article of claim 13, wherein said plug further comprises a polyvinyl alcohol.

15. The article of claim 13, wherein said plug further comprises a porous compound, said compound permeable by water, said compound comprising bio- or photo-degradable material or materials.

16. The article of claim 15, wherein said porous compound is capable of controlling the rate of water ingress.

17. A degradable article, said article comprising elongated tubular shape, said article comprising lumen, said article further comprising at least one chitin-containing compound, said article further comprising at least one enclosed compartment, said compartment further comprising at least one type of enzyme, said enzyme supplied in lyophilized form, said enzyme configured to upon exposure to aqueous solution capable of degrading said chitin-containing compound of said article, said compartment further comprising at least one aperture communicating with environment outside said lumen of said article, said aperture permitting water ingress into said compartment from outside of said article, said enzyme configured to be activated by said aqueous solution, said enzyme subsequently degrading said chitin-containing compound of said article, said article consequently configured to be degraded upon exposure to said aqueous solution from outside of said article.

* * * * *